(12) United States Patent
Nagato et al.

(10) Patent No.: US 8,583,124 B2
(45) Date of Patent: Nov. 12, 2013

(54) BASE STATION AND MOBILE COMMUNICATION METHOD TO CHANGE A TRANSMISSION POWER OF COMMUNICATION CHANNEL

(75) Inventors: Rie Nagato, Kamakura (JP); Yoshihiro Ishikawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 911 days.

(21) Appl. No.: 12/487,312

(22) Filed: Jun. 18, 2009

(65) Prior Publication Data

US 2009/0318182 A1 Dec. 24, 2009

(30) Foreign Application Priority Data

Jun. 18, 2008 (JP) ................................ P2008-159800

(51) Int. Cl.
*H04B 7/00* (2006.01)
*H04B 1/00* (2006.01)
*H04W 36/00* (2009.01)
*H04W 40/00* (2009.01)

(52) U.S. Cl.
USPC .............. 455/444; 455/445; 455/69; 455/522

(58) Field of Classification Search
USPC ............. 455/522, 69, 444, 453, 67.11, 67.13, 455/63.1, 226.1
See application file for complete search history.

(56) References Cited

U.S. PATENT DOCUMENTS

| | | | | |
|---|---|---|---|---|
| 5,666,655 A * | 9/1997 | Ishikawa et al. | ............... | 455/512 |
| 5,673,260 A * | 9/1997 | Umeda et al. | ................ | 370/342 |
| 5,832,368 A * | 11/1998 | Nakano et al. | ............... | 455/63.1 |
| 5,873,047 A * | 2/1999 | Nakano et al. | ................ | 455/561 |
| 6,073,024 A * | 6/2000 | Hasegawa | ..................... | 455/522 |
| 6,085,087 A * | 7/2000 | Hori et al. | ...................... | 455/434 |
| 6,314,090 B1 * | 11/2001 | Nakamura et al. | ............ | 370/335 |
| 6,493,561 B1 * | 12/2002 | Hasegawa | ..................... | 455/512 |
| 6,574,456 B2 * | 6/2003 | Hamabe | ........................ | 455/63.3 |
| 6,741,667 B1 * | 5/2004 | Suda | ................ | 375/354 |
| 7,099,667 B2 * | 8/2006 | Saito et al. | ..................... | 455/437 |
| 7,139,571 B1 * | 11/2006 | Ishikawa et al. | .............. | 455/434 |
| 7,197,066 B2 * | 3/2007 | Iwamoto et al. | .............. | 375/150 |
| 7,693,106 B1 * | 4/2010 | Ishikawa et al. | .............. | 370/331 |
| 7,912,034 B2 * | 3/2011 | Schwarz et al. | .............. | 370/350 |
| RE42,326 E * | 5/2011 | Hasegawa | ..................... | 455/512 |

(Continued)

FOREIGN PATENT DOCUMENTS

JP 8-289366 11/1996
JP 9-219883 A 8/1997

(Continued)

OTHER PUBLICATIONS

"Interference Management in UMTS Femtocells" Femto Forum, Dec. 2, 2008, pp. 32-47.

(Continued)

*Primary Examiner* — Tilahun B Gesesse
(74) *Attorney, Agent, or Firm* — Oblon, Spivak, McClelland, Maier & Neustadt, L.L.P.

(57) ABSTRACT

A femto base station according to the present invention includes: a downlink perch channel signal transmission power controller unit configured to change a transmission power of a downlink perch channel signal when a first condition is satisfied; and an uplink reception sensitivity controller unit configured to change an uplink reception sensitivity when a second condition is satisfied after the first condition is satisfied.

10 Claims, 6 Drawing Sheets

(56) References Cited

U.S. PATENT DOCUMENTS

| | | | |
|---|---|---|---|
| RE42,374 E * | 5/2011 | Hasegawa | 455/512 |
| RE43,138 E * | 1/2012 | Hasegawa | 455/512 |
| RE43,342 E * | 5/2012 | Hasegawa | 455/512 |
| 2002/0191562 A1 * | 12/2002 | Kumaki et al. | 370/331 |

FOREIGN PATENT DOCUMENTS

| | | |
|---|---|---|
| JP | 2007-129405 A | 5/2007 |
| JP | 2007-514367 A | 5/2007 |
| JP | 2008-524902 A | 7/2008 |
| WO | WO 2006/067672 A1 | 6/2006 |
| WO | WO 2007/139680 A2 | 12/2007 |
| WO | WO 2009/047972 A1 | 4/2009 |

OTHER PUBLICATIONS

Extended European Search Search Report issued Oct. 6, 2011, in Patent Application No. 09007977.3.

"HNB Radio Resource Management Considerations", Vodafone, ip.acess, Orange, 3GPP TSG-RAN WG 4 (Radio) Meeting #47bis, R4-081595, XP050180142, Jun. 16-20, 2008, pp. 1-4.

"HNB and Macro Uplink Performance with Adaptive Attenuation at HNB", Qualcomm Europe, 3GPP TSG-RAN WG4 #47-bis, R4-081345, XP050179936, Jun. 16-20, 2008, pp. 1-12.

$3^{rd}$ Generation Partnership Project; Technical Specification Group Radio Access Networks; 3G Home NodeB Study Item Technical Report (Release 8), 3GPP TR 25.820 V8.0.0, XP050369170, Mar. 2008, pp. 1-37.

Office Action issued Dec. 12, 2011 in China Application No. 200910149378.7 (With English Translation).

Office Action issued Aug. 28, 2012, in Japanese Patent Application No. 2008-159800 with English translation.

Chinese Office Action issued Sep. 24, 2012, In China Patent Application No. 200910149378.7 (with English translation).

* cited by examiner

| RADIUS OF DOWNLINK FEMTO CELL | | TRANSMISSION POWER OF DOWNLINK PERCH CHANNEL SIGNAL (dBm) | UPLINK RECEPTION SENSITIVITY (dBm) |
|---|---|---|---|
| RADIUS OF DOWNLINK FEMTO CELL ↓ SMALLER | default | $p = P0$ | $S0$ |
| | REDUCTION LEVEL 1 | $P1 > p \geq P2$ | $S1$ |
| | REDUCTION LEVEL 2 | $P2 > p \geq P3$ | $S2$ |
| | | .... | |
| | REDUCTION LEVEL n | $Pn-1 > p \geq Pn$ | $Sn$ |
| | IMPOSSIBLE TO TAKE MEASURES | $Pn > p$ | ALTERNATIVE MEANS |

※ NOTE : $P0 \geq P1 \geq P2 \cdots \geq Pn$ AND $S0 \leq S1 \leq S2 \cdots \leq Sn$

| RADIUS OF DOWNLINK FEMTO CELL | TRANSMISSION POWER OF DOWNLINK PERCH CHANNEL SIGNAL (dBm) | UPLINK RECEPTION SENSITIVITY (dBm) |
|---|---|---|
| default | $p = P0$ | S0 |
| INCREASE LEVEL 1 | $P2 \geq p > P1$ | S1 |
| INCREASE LEVEL 2 | $P3 \geq p > P2$ | S2 |
| | .... | |
| INCREASE LEVEL n | $Pn \geq p > Pn-1$ | Sn |

RADIUS OF DOWNLINK FEMTO CELL ↓ LARGER

※ NOTE : $P0 \leq P1 \leq P2 \cdots \leq Pn$ AND $S0 \geq S1 \geq S2 \cdots \geq Sn$

BASE STATION AND MOBILE COMMUNICATION METHOD TO CHANGE A TRANSMISSION POWER OF COMMUNICATION CHANNEL

BACKGROUND OF THE INVENTION

1. Field of the Invention

The present invention relates to a base station (specifically, a femto base station) and a mobile communication method.

2. Description of the Related Art

There has recently been developed a base station that can be installed as needed by a user. The base station is called a "femto base station" since a radius of a cell under the control thereof is smaller than that of a "macro base station" which is installed, designed and operated by a carrier.

An installation location of the femto base station may be outside the management of the carrier. Thus, the femto base station has been expected to have a cell radius autonomous adjustment function for increasing or reducing the radius of a cell under the control thereof so as to cover a desired communication area. Specifically, this function can reduce the cell radius so that the femto base station may not interfere with the existing macro base station, or reversely, can increase the cell radius so that the femto base station can overcome interference from the existing macro base station.

Here, when the femto base station reduces the radius of the cell under the control thereof, there may occur a situation where a macro mobile station which is not registered with the femto base station communicates with the macro base station without communicating with the femto base station although the macro mobile station is adjacent to the femto base station.

In such a case, since the macro base station is more distant from the macro mobile station than the femto base station, the macro mobile station performs uplink transmission with a large amount of power, which causes significant interference to the femto base station adjacent to the macro mobile station. Thus, there is a problem that the quality of unlink communication between a femto mobile station and the femto base station may deteriorate, or that the femto mobile station and the femto base station may no longer be able to communicate with each other.

Specifically, the conventional femto base station can change a radius of a downlink femto cell by changing a transmission power of a perch channel signal according to interference with a neighboring base station (macro base station), traffic congestion or service needs. However, when only the size of the downlink femto cell is changed, there may be a problem of deterioration of the uplink communication quality.

SUMMARY OF THE INVENTION

Therefore, the present invention has been made in consideration of the above problems. It is an object of the present invention to provide a base station (femto base station) and a mobile communication method, which are capable of maintaining communication quality within a femto cell even when a macro mobile station adjacent to the femto base station communicates with a macro base station.

A first aspect of the present invention is summarized as a base station including: a downlink perch channel signal transmission power controller unit configured to change a transmission power of a downlink perch channel signal, when a first condition is satisfied; and an uplink reception sensitivity controller unit configured to change an uplink reception sensitivity, when a second condition is satisfied after the first condition is satisfied.

In the first aspect, the downlink perch channel signal transmission power controller unit can be configured to determine that the first condition is satisfied and to reduce the transmission power of the downlink perch channel signal, when it is detected that an unregistered mobile station enters a cell under the control of the base station and when a frequency of communication performed by the unregistered mobile station fails to be changed to a frequency other than a frequency used in the base station.

In the first aspect, the downlink perch channel signal transmission power controller unit can be configured to determine that the first condition is satisfied and to reduce the transmission power of the downlink perch channel signal, when the transmission power of the downlink perch channel signal exceeds a predetermined value.

In the first aspect, the downlink perch channel signal transmission power controller unit can be configured to determine that the first condition is satisfied and to reduce the transmission power of the downlink perch channel signal, when it is determined that the base station is causing interference to a neighboring base station.

In the first aspect, the uplink reception sensitivity controller unit can be configured to determine that the second condition is satisfied after the first condition is satisfied and to reduce the uplink reception sensitivity, when the transmission power of the downlink perch channel signal is reduced by a predetermined value or more.

In the first aspect, the downlink perch channel signal transmission power controller unit can be configured to determine that the first condition is satisfied and to increase the transmission power of the downlink perch channel signal, when it is detected that an unregistered mobile station leaves a cell under the control of the base station.

In the first aspect, the downlink perch channel signal transmission power controller unit can be configured to determine that the first condition is satisfied and to increase the transmission power of the downlink perch channel signal, when it is determined that there is no longer a possibility of causing interference to a neighboring base station.

In the first aspect, the downlink perch channel signal transmission power controller can be configured to determine that the first condition is satisfied and to increase the transmission power of the downlink perch channel signal, when it is detected that a new neighboring base station is installed.

In the first aspect, the uplink reception sensitivity controller unit can be configured to determine that the second condition is satisfied after the first condition is satisfied and to increase the uplink reception sensitivity, when the transmission power of the downlink perch channel signal is increased by a predetermined value or more.

A second aspect of the present invention is summarized as a mobile communication method including: changing, at a base station, a transmission power of a downlink perch channel signal, when a first condition is satisfied; and changing, at the base station, an uplink reception sensitivity, when a second condition is satisfied after the first condition is satisfied.

DESCRIPTION OF THE EMBODIMENT

Configuration of Mobile Communication System According to First Embodiment of the Invention With reference to FIGS. 1 to 3, a configuration of a mobile communication system according to a first embodiment of the present invention will be described.

Hereinafter, a mobile station which is previously registered with a femto base station and performs communication by utilizing the femto base station is called a "femto mobile station", a base station providing public communication services is called a "macro base station", and a mobile station which is not registered with the femto base station and communicates not with the femto base station but with the macro base station is called a "macro mobile station".

Basically, the mobile station is configured to monitor downlink perch channel signals transmitted by the base stations, and to camp on and perform communication in a base station from which a downlink perch channel signal of a highest power is received.

Figure 1:
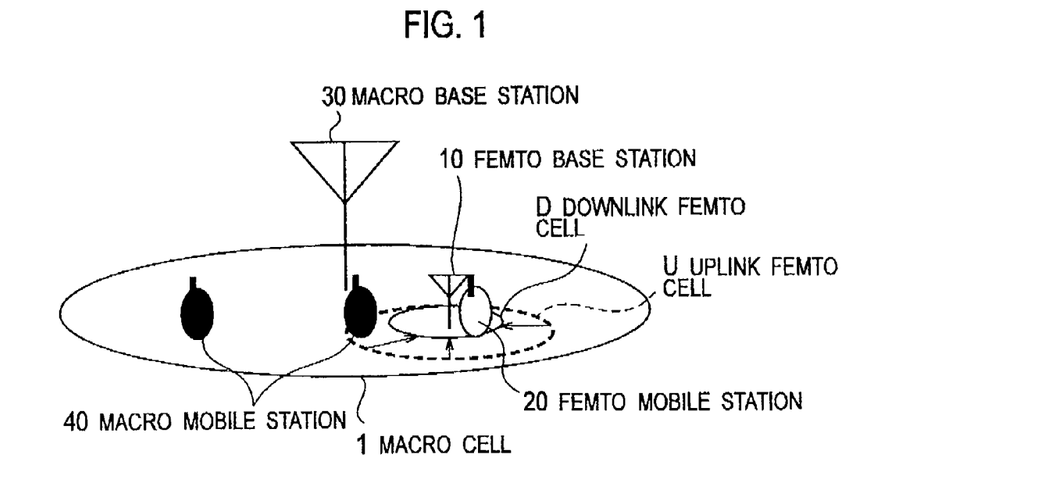
FIG. 1 is a view showing the overall configuration of a mobile communication system according to a first embodiment of the present invention.
Figure 2:
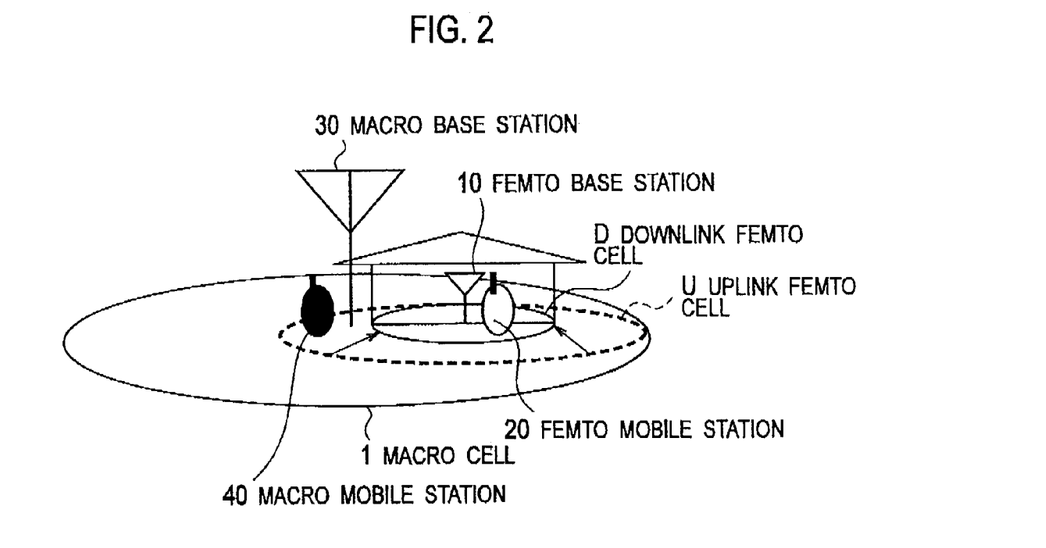
FIG. 2 is a view showing the overall configuration of the mobile communication system according to the first embodiment of the present invention.

As shown in FIGS. 1 and 2, the mobile communication system according to this embodiment includes a femto base station 10, a femto mobile station 20, a macro base station 30 and a macro mobile station 40.

FIG. 1 shows a state where the femto base station 10 exists within a macro cell 1 under the control of the macro base station 30. Moreover, FIG. 2 shows an example where a femto cell under the control of the femto base station 10 is limited to within a user's room.

Figure 3:
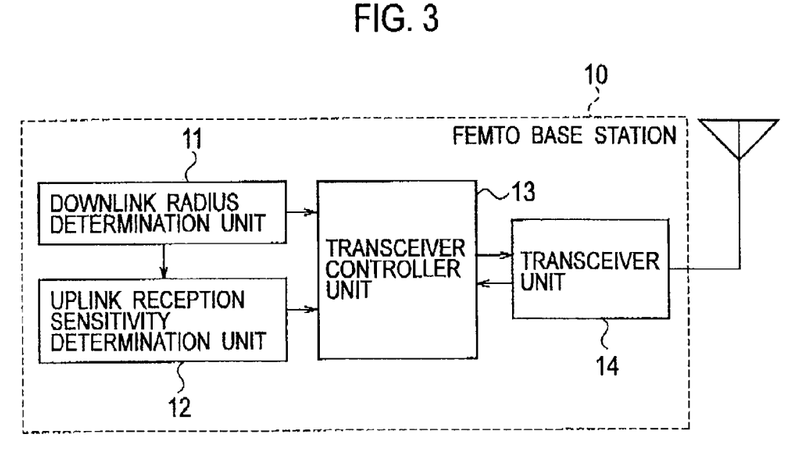
FIG. 3 is a functional block diagram of a femto base station according to the first embodiment of the present invention.

As shown in FIG. 3, the femto base station 10 includes a downlink radius determination unit 11, an uplink reception sensitivity determination unit 12, a transceiver controller unit 13 and a transceiver unit 14.

The downlink radius determination unit 11 is configured to change a transmission power of a downlink perch channel signal (downlink pilot channel signal) when a first condition is satisfied. A specific method for controlling the transmission power of the downlink perch channel signal will be described later.

The uplink reception sensitivity determination unit 12 is configured to change an uplink reception sensitivity when a second condition is satisfied after the first condition is satisfied. A specific method for controlling the uplink reception sensitivity will be described later.

Here, the uplink reception sensitivity shows an input level in the femto base station 10 required to maintain required quality of uplink communication by the femto mobile station 20. The smaller the value, the higher the uplink reception sensitivity.

The transceiver controller unit 13 is configured to control the transceiver unit 14, according to instructions from the downlink radius determination unit 11 and the uplink reception sensitivity determination unit 12.

The transceiver unit 14 is configured to communicate with the previously registered femto mobile station 20, according to an instruction from the transceiver controller unit 13.

Here, as shown in FIGS. 1 and 2, when the downlink radius determination unit 11 determines to reduce the radius of a downlink femto cell D by reducing the transmission power of the perch channel signal and the uplink reception sensitivity determination unit 12 maintains the radius of an uplink femto cell U without changing the uplink reception sensitivity, a difference in size occurs between the uplink femto cell U and the downlink femto cell D.

As a result, uplink communication between the macro base station 30 and the macro mobile station 40 existing between the uplink femto cell U and the downlink femto cell D may cause uplink interference to the femto base station 10.

Specifically, as shown in FIGS. 1 and 2, the macro mobile station 40 existing between the uplink femto cell U and the downlink femto cell D communicates with the macro base station 30 upon determining that a received power of a perch channel signal transmitted by the macro base station 30 is higher than that of a perch channel signal transmitted by the femto base station 10.

However, since the macro mobile station 40 exists within the uplink femto cell U under the control of the femto base station 10, radio waves for uplink communication between the macro mobile station 40 and the macro base station 30 may become uplink interference to the femto base station 10.

Therefore, such a problem is resolved by operations of the mobile communication system, specifically, operations of the femto base station 10 to be described later.

Operations of Mobile Communication System According to First Embodiment of the Invention With reference to FIGS. 4 to 9, description will be given of operations of the mobile communication system, specifically, operations of the femto base station 10 according to the first embodiment of the present invention.

First, with reference to FIGS. 4 to 6, description will be given of an example where the femto base station 10 reduces radii of the downlink femto cell and the uplink femto cell.

Figure 4:
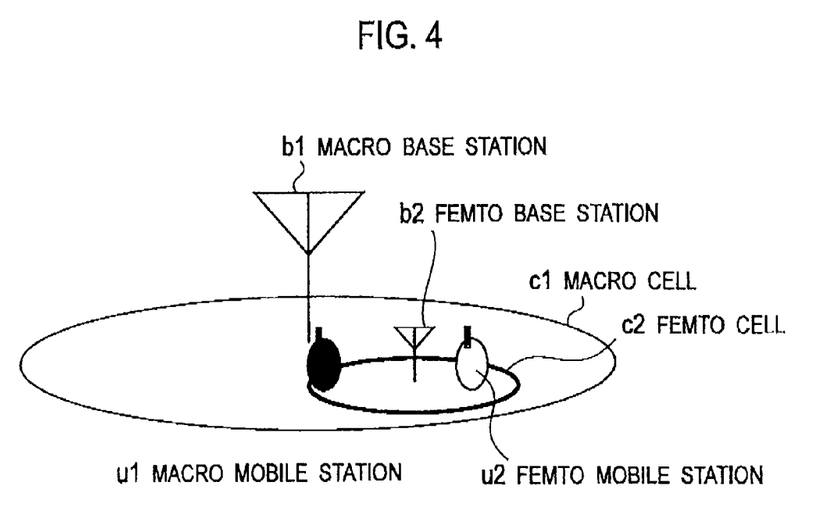
FIG. 4 is a view explaining operations of the femto base station according to the first embodiment of the present invention.

In this example, as shown in FIG. 4, the mobile communication system includes a macro base station b1, a femto base station b2, a macro mobile station u1 which is not registered with the femto base station b2 and communicates not with the femto base station b2 but with the macro base station b1, and a femto mobile station u2 which is registered with the femto base station b2 and communicates with the femto base station b2.

Moreover, a macro cell c1 is managed by the macro base station b1, and a femto cell c2 is managed by the femto base station b2. Note that, within the femto cell c2, a received power of a downlink perch channel signal transmitted by the femto base station b2 is higher than that of a downlink perch channel signal transmitted by the macro base station b1.

Figure 5:
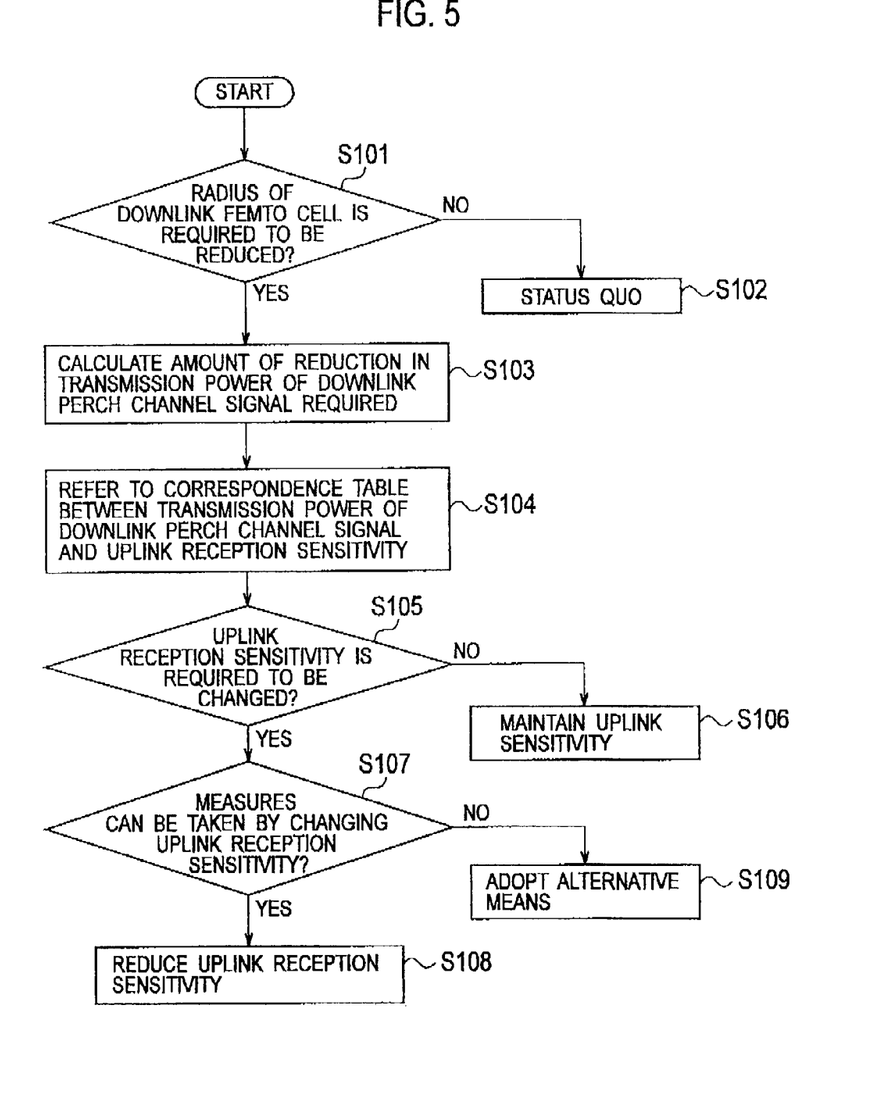
FIG. 5 is a flowchart showing operations of the femto base station according to the first embodiment of the present invention.

As shown in FIG. 5, in Step S101, the femto base station b2 determines if the radius of a downlink femto cell is required to be reduced, in other words, if a transmission power of a downlink perch channel signal should be reduced, based on whether or not a first condition is satisfied.

For example, when it is detected that the macro mobile station (unregistered mobile station) u1 enters the femto cell c2 under the control of the femto base station b2 and upon failure to change a frequency of communication performed between the macro base station b1 and the macro mobile station u1 to a frequency other than that used in the femto base station b2, the femto base station b2 may determine that the first condition (1) described above is satisfied and that it is required to reduce the transmission power of the downlink perch channel signal.

Here, the femto base station b2 can detect the macro mobile station (unregistered mobile station) u1 entering the femto cell c2 under the control of the femto base station b2, based on a location registration signal, a outgoing and incoming request signal, a communication link addition request signal or the like.

Moreover, the femto base station b2 may detect the macro mobile station (unregistered mobile station) u1 entering the femto cell c2 under the control of the femto base station b2, based on a notice from a network (for example, a radio network controller RNC in the WCDMA system, an exchange MME (Mobility Management Entity) in the LTE (Long Term Evolution) system, or the like).

For example, upon entering the femto cell c2 under the control of the femto base station b2, the macro mobile station (unregistered mobile station) u1 during communication may notify the network that the femto base station b2 is a handover destination base station. Then, based on such a notification, the network may notify the femto base station b2 that the macro mobile station (unregistered mobile station) u1 has entered the femto cell c2 under the control of the femto base station b2.

Note that, upon entering the femto cell c2, the macro mobile station u1 may notify the network that a measured value related to the femto base station b2 exceeds a threshold, instead of notifying the network that the femto base station b2 is the handover destination base station.

In this case, based on such a notification, the network notifies the femto base station b2 that the macro mobile station (unregistered mobile station) u1 has entered the femto cell c2 under the control of the femto base station b2.

Alternatively, upon entering the femto cell c2 under the control of the femto base station b2, the macro mobile station (unregistered mobile station) u1 in an IDLE mode may notify the network that the femto base station b2 is a cell change destination base station. Then, based on such a notification, the network may notify the femto base station b2 that the macro mobile station (unregistered mobile station) u1 has entered the femto cell c2 under the control of the femto base station b2.

Note that, upon entering the femto cell c2, the macro mobile station u1 may notify the network that a measured value related to the femto base station b2 exceeds a threshold, instead of notifying the network that the femto base station b2 is the cell change destination base station.

In this case, based on such a notification, the network notifies the femto base station b2 that the macro mobile station (unregistered mobile station) u1 has entered the femto cell c2 under the control of the femto base station b2.

Alternatively, when a size of the femto cell c2 under the control of the femto base station b2 exceeds a predetermined value (set in advance), in other words, when the transmission power of the downlink perch channel signal exceeds a predetermined value (set in advance), the femto base station b2 may determine that the first condition (2) described above is satisfied and that it is required to reduce the transmission power of the downlink perch channel signal.

For example, the predetermined value may be the radius of the femto cell including on its circumference a location set by the user or the like, or may be an item (for example, "large", "medium", "small" and the like) which is selected by the user or the like.

Moreover, the femto base station b2 may set the predetermined value described above based on a communication pattern of the femto mobile station u2. For example, the femto base station b2 may set the predetermined value described above by storing a received power of an uplink signal transmitted by the femto mobile station u2 and statistically calculating a communication area of the femto mobile station u2 based on a cumulative result of the received powers of the uplink signals.

Furthermore, the femto base station b2 may set the size of a room as the predetermined value described above. To measure the size of the room, the femto base station b2 may include a measuring instrument capable of measuring a room size by causing a laser, an ultrasound, an infrared ray or the like to reflect off the wall surfaces of the room.

Alternatively, when determining to be causing interference to the macro base station b1 (peripheral base station), the femto base station b2 may determine that the first condition (3) described above is satisfied and that it is required to reduce the transmission power of the downlink perch channel signal.

For example, upon detecting that a received power of a downlink signal (for example, a downlink perch channel signal) transmitted by the femto base station b2 exceeds a threshold, the macro base station b1 is configured to notify, via wire or wireless communication, the femto base station b2 of the detection and of a required amount of reduction in the transmission power of the downlink perch channel signal.

In such a case, upon receipt of the notification, the femto base station b2 can determine to be causing interference to the macro base station b1 (peripheral base station).

Moreover, the femto base station b2 constantly measures a received power (that is an interference power) of a downlink signal (for example, a downlink perch channel signal) transmitted by the macro base station b1.

When detecting that a result of the measurement exceeds a threshold, the femto base station b2 can determine to be causing interference to the macro base station b1 (neighboring base station) since the femto base station b2 is adjacent to the macro base station b1.

Alternatively, the femto base station b2 calculates a propagation loss between the femto base station b2 and the macro base station b1 based on the received power of the downlink signal transmitted by the macro base station b1 and a transmission power of the downlink signal included in a broadcast signal transmitted by the macro base station b1.

When detecting that the propagation loss is not more than a threshold, the femto base station b2 can determine to be causing interference to the macro base station b1 (neighboring base station) since the femto base station b2 is adjacent to the macro base station b1.

When it is determined that it is not required to reduce the radius of the downlink femto cell, the femto base station b2 does not change the transmission power of the downlink perch channel signal in Step S102.

On the other hand, when it is determined that it is required to reduce the radius of the downlink femto cell, the femto base station b2 calculates the amount of reduction in the transmission power of the downlink perch channel signal in Step S103.

For example, when it is determined that the first condition (1) described above is satisfied, the femto base station b2 may determine to reduce the transmission power of the downlink perch channel signal, based on the received power of the downlink perch channel signal of the femto base station b2, which is measured by the macro mobile station u1.

Specifically, the transmission power of the downlink perch channel signal is reduced to a level at which the macro mobile station u1 does not select the femto cell c2 as a camp-on cell or a cell to perform communication.

Here, the femto base station b2 may receive the received power of the downlink perch channel signal thereof via a network or may wirelessly receive the received power from the macro mobile station u1.

Alternatively, the femto base station b2 may determine the amount of reduction in the transmission power of the downlink perch channel signal in the following manner.

Specifically, when it is determined that the first condition (2) described above is satisfied, the user transmits an outgoing request signal from a predetermined location by using the femto mobile station u2.

Thereafter, the femto base station b2 can calculate a propagation loss by measuring a received power of the outgoing request signal, and based on the propagation loss, and can determine the amount of reduction in the transmission power of the downlink perch channel signal so as not to reach outside the femto cell c2 of a size equal to a preset predetermined value.

Moreover, when it is determined that the first condition (2) described above is satisfied, the femto base station b2 may determine the amount of reduction in the transmission power of the downlink perch channel signal, based on the transmission power stored in association with the item selected by the user or the like.

Furthermore, when it is determined that the first condition (3) described above is satisfied, the femto base station b2 may determine to reduce the transmission power of the downlink perch channel signal by the amount of reduction in the transmission power of the downlink perch channel signal, notified of by the macro base station b1.

Figure 6:
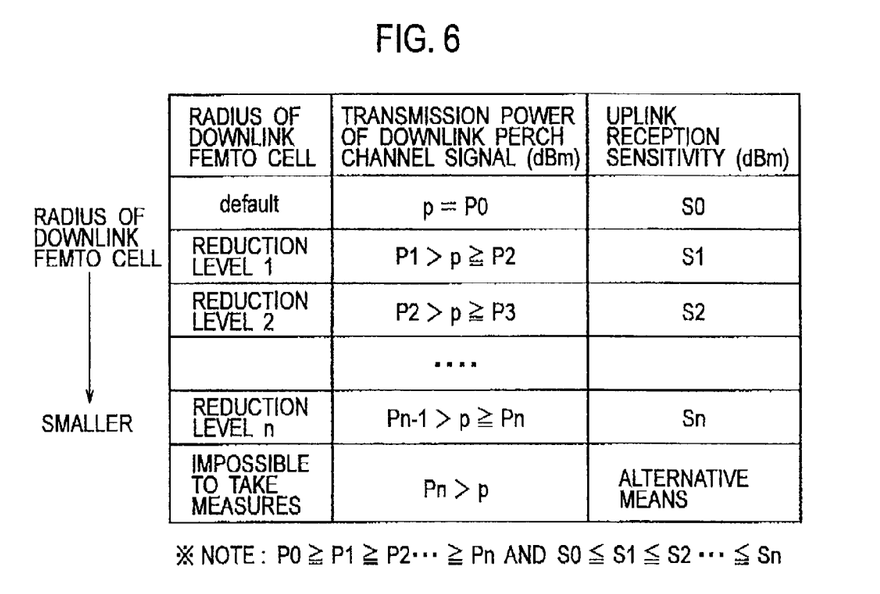
FIG. 6 is a table for explaining operations of the femto base station according to the first embodiment of the present invention.

The femto base station b2 refers to a correspondence table between the "transmission power of the downlink perch channel" and an "uplink reception sensitivity" shown in FIG. 6 in Step S104, and determines whether or not to change the uplink reception sensitivity based on whether or not a second condition is satisfied in Step S105.

Note that the correspondence table may be previously held by the femto base station b2, or the femto base station b2 may be notified of the correspondence table via a network (for example, a radio network controller RNC in the WCDMA system, an exchange MME (Mobility Management Entity) in the LTE (Long Term Evolution) system, or the like).

Moreover, two or more correspondence tables may be provided, such as a correspondence table for fine control and a correspondence table for rough control.

Here, when the transmission power of the downlink perch channel signal is reduced by a predetermined value or more, the femto base station b2 determines that the second condition is satisfied after the first condition is satisfied and that it is required to reduce the uplink reception sensitivity. Thereafter, the operation moves to Step S107.

When the transmission power of the downlink perch channel signal is not reduced by the predetermined value or more, the femto base station b2 determines that it is not required to reduce the uplink reception sensitivity and therefore does not change the uplink reception sensitivity in Step S106.

On the other hand, when the amount of reduction in the downlink perch channel signal is too large, there is a possibility that uplink interference cannot be prevented even if the uplink reception sensitivity is reduced by the femto base station b2.

Thus, in Step S107, the femto base station b2 determines whether or not the uplink interference can be prevented by changing the uplink reception sensitivity.

When it is determined that the uplink interference can be prevented by changing the uplink reception sensitivity, the femto base station b2 reduces the uplink reception sensitivity in Step S108.

On the other hand, when it is determined that the uplink interference cannot be prevented by changing the uplink reception sensitivity, the femto base station b2 adopts alternative means, such as changing a frequency used in the femto base station b2, in Step S109.

Specifically, as shown in FIG. 6, when the reduced transmission power "p" of the downlink perch channel is "$P0 \geq p \geq P1$", the femto base station b2 determines that the transmission power of the downlink perch channel signal is not reduced by the predetermined value or more and does not change the uplink reception sensitivity (maintains the uplink reception sensitivity to be "S0").

Moreover, when the reduced transmission power p of the downlink perch channel is "$P1 > p \geq Pn$", the femto base station b2 reduces the uplink reception sensitivity so as to obtain the "uplink reception sensitivity" corresponding to a "reduction level" to which the reduced transmission power "p" of the downlink perch channel belongs.

Note that, when the reduced transmission power "p" of the downlink perch channel is "$p < Pn$", the femto base station b2 adopts the alternative means described above.

Here, the transmission power of the downlink perch channel before being changed is "P0", and the uplink reception sensitivity before being changed is "S0". Moreover, it is assumed that "$P0 \geq P1 \geq P2 \geq \ldots \geq Pn$" and "$S0 \leq S1 \leq S2 \leq \ldots Sn$".

Moreover, the femto base station b2 can reduce the uplink reception sensitivity by increasing the number of uplink variable attenuators provided between an antenna and a receiver, by increasing an NF in the femto base station b2 or by reducing an uplink reception sensitivity of the antenna.

Moreover, the femto base station b2 may reduce the uplink reception sensitivity when continuously transmitting a predetermined number of transmission power control (TPC) commands "DOWN" relative to the uplink signal of the femto mobile station u2.

Secondly, with reference to FIGS. 7 to 9, description will be given of an example where the femto base station 10 increases the radii of the downlink femto cell and the uplink femto cell.

Figure 7:
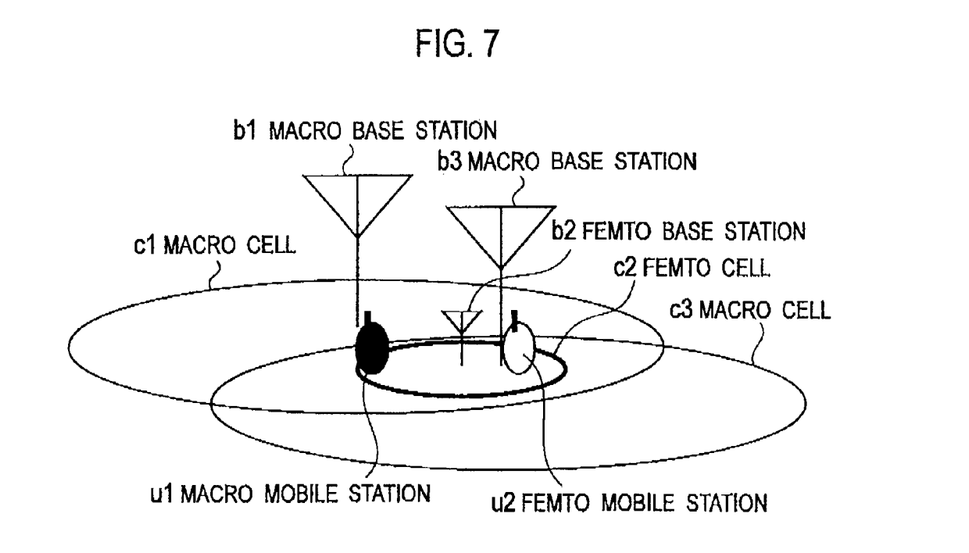
FIG. 7 is a view explaining operations of the femto base station according to the first embodiment of the present invention.

As shown in FIG. 7, when the femto base station b2 increases the radius of the downlink femto cell by increasing the transmission power of the downlink perch channel signal, a required femto cell c2 can be covered by increasing the uplink reception sensitivity and thus increasing the radius of the uplink femto cell.

Alternatively, as shown in FIGS. 4 and 6, when the femto base station b2 reduces the radius of the uplink femto cell and then restores the radius of the downlink femto cell by necessity, the radius of the uplink femto cell can also be restored.

Figure 8:
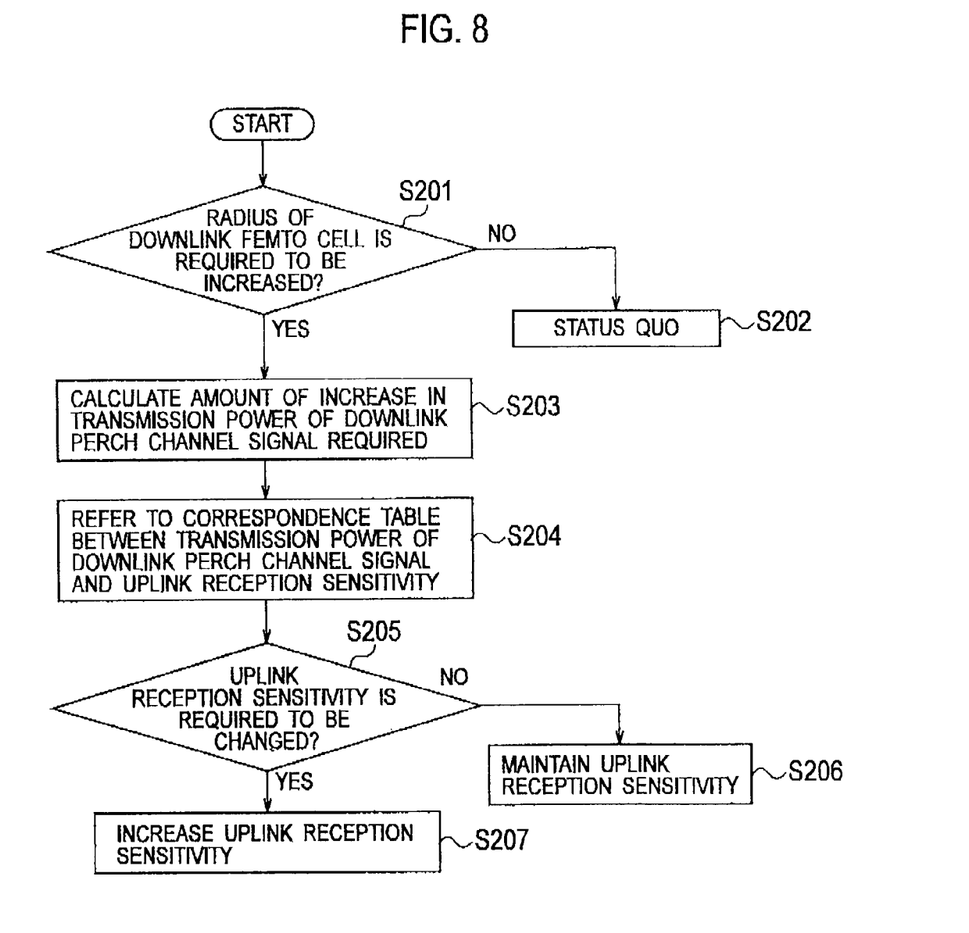
FIG. 8 is a flowchart showing operations of the femto base station according to the first embodiment of the present invention.

As shown in FIG. 8, in Step S201, the femto base station b2 determines if the radius of a downlink femto cell is required to be increased, in other words, if a transmission power of a downlink perch channel signal should be increased, based on whether or not a first condition is satisfied.

For example, when detecting that the macro mobile station u1 (unregistered mobile station) has left the femto cell c2 under the control of the femto base station b2, the femto base station b2 may determine that the first condition (4) described above is satisfied and that it is required to increase the transmission power of the downlink perch channel signal.

Here, the femto base station b2 can detect that the macro mobile station (unregistered mobile station) u1 has left the femto cell c2 under the control of the femto base station b2, based on a location registration signal, a outgoing and incoming request signal, a communication link addition request signal or the like.

Moreover, the femto base station b2 may detect that the macro mobile station (unregistered mobile station) u1 has left the femto cell c2 under the control of the femto base station b2, based on a notice from a network (for example, a radio network controller RNC in the WCDMA system, an exchange MME (Mobility Management Entity) in the LTE (Long Term Evolution) system, or the like).

For example, upon leaving the femto cell c2 under the control of the femto base station b2, the macro mobile station (unregistered mobile station) u1 during communication may notify the network of a macro base station around the femto base station b2 as a handover destination base station.

Moreover, based on such a notification, the network may notify the femto base station b2 that the macro mobile station (unregistered mobile station) u1 has left the femto cell c2 under the control of the femto base station b2.

Note that, upon leaving the femto cell c2, the macro mobile station u1 may notify the network that a measured value related to the macro base station around the femto base station b2 exceeds a threshold, instead of notifying the network of the macro base station around the femto base station b2 as the handover destination base station.

In this case, based on such a notification, the network notifies the femto base station b2 that the macro mobile station (unregistered mobile station) u1 has left the femto cell c2 under the control of the femto base station b2.

Alternatively, upon leaving the femto cell c2 under the control of the femto base station b2, the macro mobile station (unregistered mobile station) u1 in an IDLE mode may notify the network of the macro base station around the femto base station b2 as a cell change destination base station.

Moreover, based on such a notification, the network may notify the femto base station b2 that the macro mobile station (unregistered mobile station) u1 has left the femto cell c2 under the control of the femto base station b2.

Note that, upon leaving the femto cell c2, the macro mobile station u1 may notify the network that a measured value related to the macro base station around the femto base station b2 exceeds a threshold, instead of notifying the network of the macro base station around the femto base station b2 as the cell change destination base station.

In this case, based on such a notification, the network notifies the femto base station b2 that the macro mobile station (unregistered mobile station) u1 has left the femto cell c2 under the control of the femto base station b2.

Moreover, when it is determined that there is no longer a possibility of causing interference to the macro base station b1 (neighboring base station), the femto base station b2 determines that the first condition (5) described above is satisfied and that it is required to increase the transmission power of the downlink perch channel signal.

Here, the femto base station b2 searches for a neighboring macro base station b1. When no downlink perch channel signal of the macro base station b1 can be detected with a received power not less than a certain value for more than a certain period of time, the femto base station b2 can determine that there is no longer a possibility of causing interference to the macro base station b1 since there is no more neighboring macro base station b1.

Furthermore, when it is detected that a new macro base station (neighboring base station) is installed, the femto base station b2 determines that the first condition (6) described above is satisfied and that it is required to increase the transmission power of the downlink perch channel signal.

Here, the femto base station b2 can find installation of a new macro base station b3 by searching for downlink perch channel signals to regularly check if there are macro base stations around the femto base station b2.

Alternatively, the femto base station b2 can find installation of the new macro base station b3 based on a notice from the network.

When it is determined that it is not required to increase the radius of the downlink femto cell, the femto base station b2 does not change the transmission power of the downlink perch channel signal in Step S202.

On the other hand, when it is determined that it is required to increase the radius of the downlink femto cell, the femto base station b2 calculates an amount of increase in the transmission power of the downlink perch channel signal in Step S203.

For example, when it is determined that the first conditions (4) and (5) described above are satisfied, the femto base station b2 may determine to restore the reduced radius of the downlink femto cell by restoring the transmission power of the downlink perch channel signal to a predetermined value "P0".

For example, assume a case where it is determined that the first condition (6) described above is satisfied and a received power of the downlink perch channel signal of the macro base station b3 is higher than that of the downlink perch channel signal of the macro base station b1.

In such a case, the femto base station b2 calculates an optimum transmission power of the downlink perch channel signal for the macro base station b3.

Moreover, when the transmission power thus calculated is higher than the previous transmission power, the femto base station b2 increases the transmission power of the downlink perch channel signal to the calculated transmission power.

Figure 9:
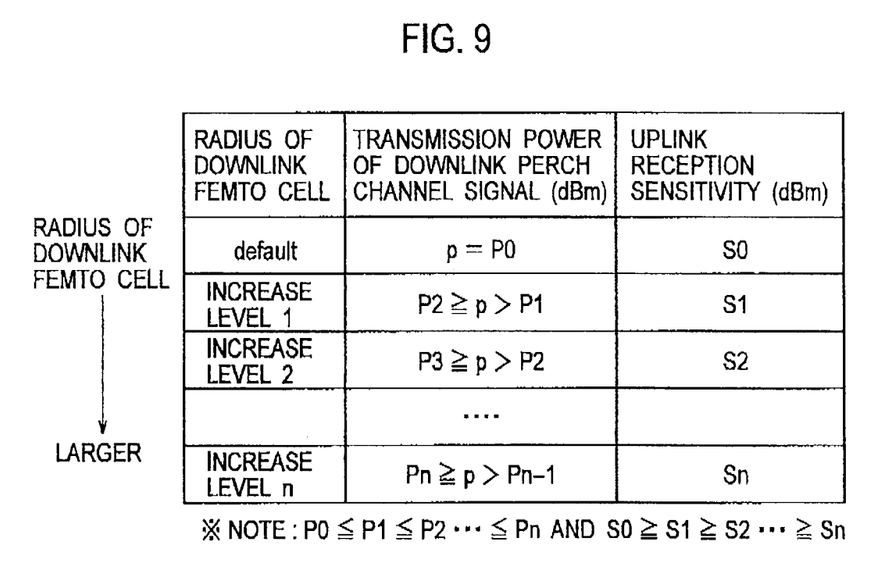
FIG. 9 is a view explaining operations of the femto base station according to the first embodiment of the present invention.

The femto base station b2 refers to a correspondence table between the "transmission power of the downlink perch channel" and an "uplink reception sensitivity" shown in FIG. 9 in Step S204, and determines whether or not to change the uplink reception sensitivity based on whether or not a second condition is satisfied in Step S205.

Note that the correspondence table may be previously held by the femto base station b2, or the femto base station b2 may be notified of the correspondence table via a network (for example, a radio network controller RNC in the WCDMA system, an exchange MME (Mobility Management Entity) in the LTE (Long Term Evolution) system, or the like).

Moreover, two or more correspondence tables may be provided, such as a correspondence table for fine control and a correspondence table for rough control.

Here, when the transmission power of the downlink perch channel signal is increased by a predetermined value or more, the femto base station b2 determines that the second condition is satisfied after the first condition is satisfied and that it is required to increase the uplink reception sensitivity. Thereafter, the operation moves to Step S207.

When the transmission power of the downlink perch channel signal is not increased by the predetermined value or more, the femto base station b2 determines that it is not required to increase the uplink reception sensitivity and therefore does not change the uplink reception sensitivity in Step S206.

When it is determined that it is required to increase the uplink reception sensitivity, the femto base station b2 increases the uplink reception sensitivity in Step S207.

Specifically, as shown in FIG. 9, when the increased transmission power "p" of the downlink perch channel is "P0≤p≤P1", the femto base station b2 determines that the transmission power of the downlink perch channel signal will not be increased by the predetermined value or more and does not change the uplink reception sensitivity (maintains the uplink reception sensitivity to be "S0").

Moreover, when the increased transmission power "p" of the downlink perch channel is "P1<p≤Pn", the femto base station b2 increases the uplink reception sensitivity to obtain the "uplink reception sensitivity" corresponding to an "increase level" to which the increased transmission power "p" of the downlink perch channel belongs.

Here, the transmission power of the downlink perch channel before being changed is "P0", and the uplink reception sensitivity before being changed is "S0". Moreover, it is assumed that "P0≤P1≤P2≤ . . . ≤Pn" and "S0>S1≥S2≥ . . . ≥ Sn".

Moreover, the femto base station b2 can increase the uplink reception sensitivity by reducing the number of uplink variable attenuators provided between an antenna and a receiver, by reducing an NF in the femto base station b2, by extending a dynamic range of the femto base station b2 or by increasing an uplink reception sensitivity of the antenna.

Moreover, the femto base station b2 may increase the uplink reception sensitivity when continuously transmitting a predetermined number of transmission power control (TPC) commands "UP" relative to the uplink signal of the femto mobile station u2.

Operations and Effects of Mobile Communication System According to First Embodiment of the Invention According to the mobile communication system according to the first embodiment of the present invention, when the radius of the downlink femto cell is reduced by the cell radius autonomous adjustment function of the femto base station b2 for the downlink femto cell, the radius of the uplink femto cell is also reduced by reducing the uplink reception sensitivity according to the amount of reduction in the transmission power of the downlink perch channel signal. Thus, communication quality can be maintained within the femto cell c2 of the femto base station b2 even when the macro mobile station u1 adjacent to the femto base station b2 communicates with the macro base station b1.

Moreover, according to the mobile communication system according to the first embodiment of the present invention, when the radius of the downlink femto cell is increased, the radius of the uplink femto cell is also increased by increasing the uplink reception sensitivity according to the amount of increase in the transmission power of the downlink perch channel signal. Thus, it is possible to prevent a situation where downlink communication is possible but uplink communication is impossible.

Modified Example

In the above embodiment, the description has been given of the communication using the macro base station b1 and the femto base station b2. However, the present invention is also effective in avoiding interference between femto base stations having different mobile stations (femto mobile stations) registered therewith.

In such a case, the above operations can be applied by assuming that the "macro base station b1" is a "femto base station b4" with which a mobile station (femto mobile station) different from that registered with the femto base station b2 is registered.

Moreover, the above operations of the femto base station 10 may be performed by hardware, by a software module executed by a processor, or by a combination of both.

The software module may be provided in any form of storage medium, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk and a CD-ROM.

Such a storage medium is connected to the processor so as to enable the processor to read and write information from and into the storage medium. Moreover, the storage medium may be integrated with the processor. Moreover, the storage medium and the processor may be provided in an ASIC. The ASIC may be provided in the femto base station 10. Moreover, the storage medium and the processor may be provided in the femto base station 10 as discrete components.

Although the present invention has been described in detail above by use of the embodiment, it is apparent to those skilled in the art that the present invention is not limited to the embodiment described in the present specification. The present invention can be implemented as altered and modified embodiments without departing from the spirit and scope of the present invention as defined by the claims. Therefore, the description of the present specification is for illustrative purposes and is not intended to limit the present invention in any way.

The present invention can provide a base station (femto base station) and a mobile communication method, which are capable of maintaining communication quality within a femto cell even when a macro mobile station adjacent to the femto base station communicates with a macro base station.

What is claimed is:
1. A base station comprising:
a downlink perch channel signal transmission power controller unit that changes a transmission power of a downlink perch channel signal, when a first condition is satisfied; and
an uplink reception sensitivity controller unit that changes an uplink reception sensitivity, when a second condition is satisfied after the first condition is satisfied,
wherein the downlink perch channel signal transmission power controller unit determines that the first condition is satisfied and reduces the transmission power of the downlink perch channel signal, when it is detected that an unregistered mobile station enters a cell under the control of the base station and when a frequency of communication performed by the unregistered mobile station fails to be changed to a frequency other than a frequency used in the base station, and
wherein the uplink reception sensitivity controller unit determines that the second condition is satisfied after the first condition is satisfied and reduces the uplink reception sensitivity, when the transmission power of the downlink perch channel signal is reduced by a predetermined value or more.

2. The base station according to claim 1, wherein
the downlink perch channel signal transmission power controller unit determines that the first condition is satisfied and reduces the transmission power of the downlink perch channel signal, when the transmission power of the downlink perch channel signal exceeds a predetermined value.

3. The base station according to claim 1, wherein
the downlink perch channel signal transmission power controller unit determines that the first condition is satisfied and reduces the transmission power of the downlink perch channel signal, when it is determined that the base station is causing interference to a neighboring base station.

4. The base station according to claim 1, wherein
the downlink perch channel signal transmission power controller unit determines that the first condition is satisfied and increases the transmission power of the downlink perch channel signal, when it is detected that an unregistered mobile station leaves a cell under the control of the base station.

5. The base station according to claim 1, wherein
the downlink perch channel signal transmission power controller unit determines that the first condition is satisfied and increases the transmission power of the downlink perch channel signal, when it is determined that there is no longer a possibility of causing interference to a neighboring base station.

6. The base station according to claim 1, wherein
the downlink perch channel signal transmission power controller determines that the first condition is satisfied and increases the transmission power of the downlink perch channel signal, when it is detected that a new neighboring base station is installed.

7. The base station according to claim 4, 5, or 6, wherein
the uplink reception sensitivity controller unit determines that the second condition is satisfied after the first condition is satisfied and increases the uplink reception sensitivity, when the transmission power of the downlink perch channel signal is increased by a predetermined value or more.

8. A mobile communication method comprising:
changing, at a base station, a transmission power of a downlink perch channel signal, when a first condition is satisfied; and
changing, at the base station, an uplink reception sensitivity, when a second condition is satisfied after the first condition is satisfied,
wherein the method includes determining that the first condition is satisfied and reducing the transmission power of the downlink perch channel signal, when it is detected that an unregistered mobile station enters a cell under the control of the base station and when a frequency of communication performed by the unregistered mobile station fails to be changed to a frequency other than a frequency used in the base station, and
wherein the method further includes determining that the second condition is satisfied after the first condition is satisfied and reduces the uplink reception sensitivity, when the transmission power of the downlink perch channel signal is reduced by a predetermined value or more.

9. A femto base station comprising:
a downlink perch channel signal transmission power controller unit that changes a transmission power of a downlink perch channel signal, when a first condition is satisfied; and
an uplink reception sensitivity controller unit that changes an uplink reception sensitivity, when a second condition is satisfied after the first condition is satisfied,
wherein the downlink perch channel signal transmission power controller unit determines that the first condition is satisfied and reduces the transmission power of the downlink perch channel signal, when it is detected that an unregistered mobile station, which is not registered with the femto base station, enters a cell under the control of the femto base station and when a frequency of communication performed by the unregistered mobile station fails to be changed to a frequency other than a frequency used in the femto base station, and
wherein the unregistered mobile station is registered with a macro base station that controls a cell with a larger radius than the cell under the control of the femto base station.

10. A base station comprising:
a downlink perch channel signal transmission power controller unit that changes a transmission power of a downlink perch channel signal, when a first condition is satisfied; and
an uplink reception sensitivity controller unit that changes an uplink reception sensitivity, when a second condition is satisfied after the first condition is satisfied,
wherein the downlink perch channel signal transmission power controller unit determines that the first condition is satisfied and increases the transmission power of the downlink perch channel signal, when it is detected that an unregistered mobile station leaves a cell under the control of the base station, and
wherein the uplink reception sensitivity controller unit determines that the second condition is satisfied after the first condition is satisfied and increases the uplink reception sensitivity, when the transmission power of the downlink perch channel signal is increased by a predetermined value or more.

* * * * *